(12) United States Patent
Yang

(10) Patent No.: US 11,116,146 B2
(45) Date of Patent: Sep. 14, 2021

(54) CULTIVATION ASSEMBLY

(71) Applicant: T.U.I. INDUSTRIAL CO., LTD., Taipei (TW)

(72) Inventor: Yu-Ting Yang, Taipei (TW)

(73) Assignee: T.U.I. INDUSTRIAL CO., LTD., Taipei (TW)

( * ) Notice: Subject to any disclaimer, the term of this patent is extended or adjusted under 35 U.S.C. 154(b) by 55 days.

(21) Appl. No.: 16/525,033

(22) Filed: Jul. 29, 2019

(65) Prior Publication Data
US 2021/0029976 A1 Feb. 4, 2021

(51) Int. Cl.
*A01G 9/02* (2018.01)
*A47B 47/00* (2006.01)

(52) U.S. Cl.
CPC ............. *A01G 9/027* (2013.01); *A01G 9/023* (2013.01); *A47B 47/0091* (2013.01)

(58) Field of Classification Search
CPC ... A47B 47/00; A47B 47/0091; A47B 47/047; A47B 47/0008; A47B 47/0016; A47B 47/0025; A47B 47/0041; A47B 47/0033; A47B 47/005; A47B 47/021; A47B 47/02; A47B 47/024; A47B 47/025; A47B 47/03; A47B 47/04; A47B 87/0276; A47B 87/02; A47B 87/0207; A47B 87/0215; A47B 87/0223; A47B 2087/023; A47B 2087/0238; A47B 87/0246; B65D 21/0201; B65D 21/0202; B65D 21/00; B65D 21/0204; A47F 7/281; A47F 5/0031; A01G 9/02; A01G 9/022; A01G 9/023; A01G 31/06; A01G 9/027; A01G 27/005; A01K 63/045; A01K 61/00; A01K 63/00; A01K 63/003; A01K 63/047; A01K 67/033; A01K 61/10
See application file for complete search history.

(56) References Cited

U.S. PATENT DOCUMENTS

| | | | | |
|---|---|---|---|---|
| 986,395 | A * | 3/1911 | King | A01G 9/28 47/33 |
| 3,131,829 | A * | 5/1964 | Masser | B65D 21/0204 206/144 |
| 3,194,426 | A * | 7/1965 | Brown, Jr. | B65D 21/0204 220/23.4 |
| 3,661,434 | A * | 5/1972 | Alster | A47B 87/0207 312/111 |
| 3,754,805 | A * | 8/1973 | Pangburn | E04H 13/006 312/111 |

(Continued)

*Primary Examiner* — Jonathan Liu
*Assistant Examiner* — Devin K Barnett
(74) *Attorney, Agent, or Firm* — Withrow & Terranova, P.L.L.C.

(57) ABSTRACT

A cultivation assembly has a container, at least one first engaging structure facing outside of the container, and an engaging member. The engaging member is configured to connect the container of another cultivation assembly side by side. The engaging member has two second engaging structures facing opposite directions. Each one of the two second engaging structures is capable of engaging with one of the at least one first engaging structure. The container of the cultivation assembly is capable of being connected to the container of another cultivation assembly side by side via the engaging member and without wasting a lot of labor to move the container.

6 Claims, 19 Drawing Sheets

(56) References Cited

U.S. PATENT DOCUMENTS

| | | | |
|---|---|---|---|
| 3,836,218 A * | 9/1974 | Hallal | A47B 47/0041 312/111 |
| 3,874,753 A * | 4/1975 | Naito | A47B 47/0041 312/111 |
| 3,896,743 A * | 7/1975 | Pariente | A47C 4/03 108/190 |
| 3,909,914 A * | 10/1975 | Symons | A47B 47/00 29/433 |
| 4,192,562 A * | 3/1980 | Bishoff | A47B 87/02 211/189 |
| 4,470,647 A * | 9/1984 | Bishoff | F16B 5/07 312/108 |
| 4,770,297 A * | 9/1988 | Chang | B65D 85/28 206/379 |
| 5,046,789 A * | 9/1991 | Lee | F16B 12/46 312/108 |
| 5,050,755 A * | 9/1991 | Strawder | B65D 21/0202 220/23.4 |
| 5,381,916 A * | 1/1995 | Strawder | B65D 21/0202 220/212 |
| 5,466,057 A * | 11/1995 | Blankenburg | A47B 47/0041 312/108 |
| 5,466,058 A * | 11/1995 | Chan | A47B 47/0075 312/111 |
| D372,419 S * | 8/1996 | Ikegami | D8/382 |
| 5,638,973 A * | 6/1997 | Dewey | B65D 11/1873 206/509 |
| 5,647,181 A * | 7/1997 | Hunts | A63H 33/10 312/111 |
| 5,775,046 A * | 7/1998 | Fanger | A47B 81/06 108/157.16 |
| 5,810,187 A * | 9/1998 | Woodring | B65D 67/02 206/504 |
| 5,888,114 A * | 3/1999 | Slocum | A47B 47/0075 446/118 |
| 5,921,646 A * | 7/1999 | Hwang | F16B 5/0642 312/249.8 |
| 6,050,657 A * | 4/2000 | Hiltzman | A47B 87/007 312/107 |
| 6,557,955 B2 * | 5/2003 | Saravis | A47B 47/0033 312/111 |
| 6,669,036 B1 * | 12/2003 | Yang | A47B 47/0033 211/181.1 |
| 6,764,144 B2 * | 7/2004 | Insalaco | A47B 47/00 312/108 |
| 7,234,604 B2 * | 6/2007 | Eisele | A47B 57/42 108/65 |
| 7,472,969 B2 * | 1/2009 | Saravis | A47B 47/0033 312/111 |
| 7,726,071 B2 * | 6/2010 | Carpenter | A01G 9/033 47/65.9 |
| 8,573,428 B2 * | 11/2013 | Furuta | B62B 3/006 220/23.2 |
| 9,591,815 B2 * | 3/2017 | Fujiyama | A01G 9/00 |
| 9,924,851 B2 * | 3/2018 | Kulkarni | A47L 15/505 |
| 10,555,605 B1 * | 2/2020 | Berger | A47B 47/047 |
| 2004/0155562 A1 * | 8/2004 | Saravis | F16B 12/38 312/111 |
| 2004/0178704 A1 * | 9/2004 | Saravis | A47B 47/0091 312/111 |
| 2006/0207957 A1 * | 9/2006 | Chen | A47B 47/0066 211/188 |
| 2007/0095773 A1 * | 5/2007 | Schwerman | A47B 47/0091 211/187 |
| 2007/0108878 A1 * | 5/2007 | Chen | A47B 47/0091 312/257.1 |
| 2011/0114585 A1 * | 5/2011 | Abene | B01L 13/02 211/126.3 |
| 2012/0312245 A1 * | 12/2012 | Lin | A01K 1/031 119/417 |
| 2013/0146498 A1 * | 6/2013 | Chen | B65D 21/0209 206/509 |
| 2013/0161320 A1 * | 6/2013 | Myers | B65D 21/0204 220/23.4 |
| 2014/0283448 A1 * | 9/2014 | Harris | A01G 9/045 47/66.6 |
| 2016/0095430 A1 * | 4/2016 | Moyer | A47B 47/0091 312/265.4 |
| 2016/0174519 A1 * | 6/2016 | Chang | A01K 1/031 119/419 |
| 2016/0331135 A1 * | 11/2016 | Knudson | E04F 11/035 |
| 2016/0367055 A1 * | 12/2016 | Rausch | A47G 21/14 |
| 2017/0217634 A1 * | 8/2017 | Hendrickson | B65D 21/0231 |
| 2017/0231205 A1 * | 8/2017 | Unger | A01K 67/033 119/6.6 |
| 2017/0290421 A1 * | 10/2017 | Wood | A47B 47/0091 |
| 2017/0320621 A1 * | 11/2017 | Yen | B65D 21/0224 |
| 2019/0274425 A1 * | 9/2019 | Chiao | A47B 57/12 |
| 2019/0367216 A1 * | 12/2019 | Kao | B65D 21/0231 |
| 2020/0039689 A1 * | 2/2020 | Leinbach | B65D 21/0204 |
| 2020/0291639 A1 * | 9/2020 | Bar | E04H 1/125 |

* cited by examiner

CULTIVATION ASSEMBLY

BACKGROUND OF THE INVENTION

Field of the Invention

The present invention relates to a container for cultivating insects, small animals, or plants, and more particularly to a cultivation assembly that can be flexibly assembled according to requirements of usage and can save labor in assembling multiple cultivation assemblies side by side.

Description of Related Art

A cultivation box is a container for breeding insects, small animals, or plants. However, breeding fishes, shrimps, or plants requires a large area of land for building a culture pond or planting. Land in the urban region is rare, expensive, and cannot meet the requirements of extensive cultivating. Many urban dwellers use cultivation boxes for cultivation or even environmental afforestation.

A traditional cultivation box only has one container. When multiple traditional cultivation boxes are used for cultivating, the arrangement of the traditional cultivation boxes should be made according to limitation of land and space. Since the traditional cultivation box lacks components for stacking, the traditional cultivation boxes are only suitable for side-by-side arrangement. When two of the traditional cultivation boxes are simply stacked, there is no space between the two traditional cultivation boxes due to lack of the components for stacking. A lower one of the two traditional cultivation boxes has poor ventilation and cannot acquire sufficient light. Therefore, the traditional boxes are not suitable for stacking and are limited in space utilization. The traditional cultivation boxes have to be supported by an additional frame for stacking. Moreover, the traditional cultivation boxes lack components for combining two adjacent containers of the two traditional cultivation boxes side by side. Therefore, the two adjacent containers offset easily.

A conventional cultivation box has been invented for improving abovementioned drawbacks of the traditional cultivation boxes. The conventional cultivation box has a container and combination components disposed on the container of the conventional cultivation box. The combination components of the conventional cultivation box are directly arranged on the container of the conventional cultivation box, so when two conventional cultivation boxes are combined, one of the two conventional cultivation boxes has to be moved to combine with the other one of the two conventional cultivation boxes. Moving the container of the conventional cultivation box takes a lot of labor, especially when the container of the conventional cultivation box has objects contained therein.

To overcome the shortcomings of the conventional cultivation box, the present invention provides a cultivation assembly to mitigate or obviate the aforementioned problems.

SUMMARY OF THE INVENTION

The main objective of the present invention is to provide a cultivation assembly that is easy to be assembled and saves labor.

The cultivation assembly comprises a container and at least one first engaging structure facing outside of the container, and an engaging member. The engaging member is configured to connect the container of another cultivation assembly side by side. The engaging member has two second engaging structures facing opposite directions. Each one of the two second engaging structures is capable of engaging with one of the at least one first engaging structure. The container of the cultivation assembly is capable of being connected to the container of another cultivation assembly side by side via the engaging member and without wasting a lot of labor to move the container.

Other objects, advantages, and novel features of the invention will become more apparent from the following detailed description when taken in conjunction with the accompanying drawings.

DETAILED DESCRIPTION OF PREFERRED EMBODIMENTS

Figure 1:
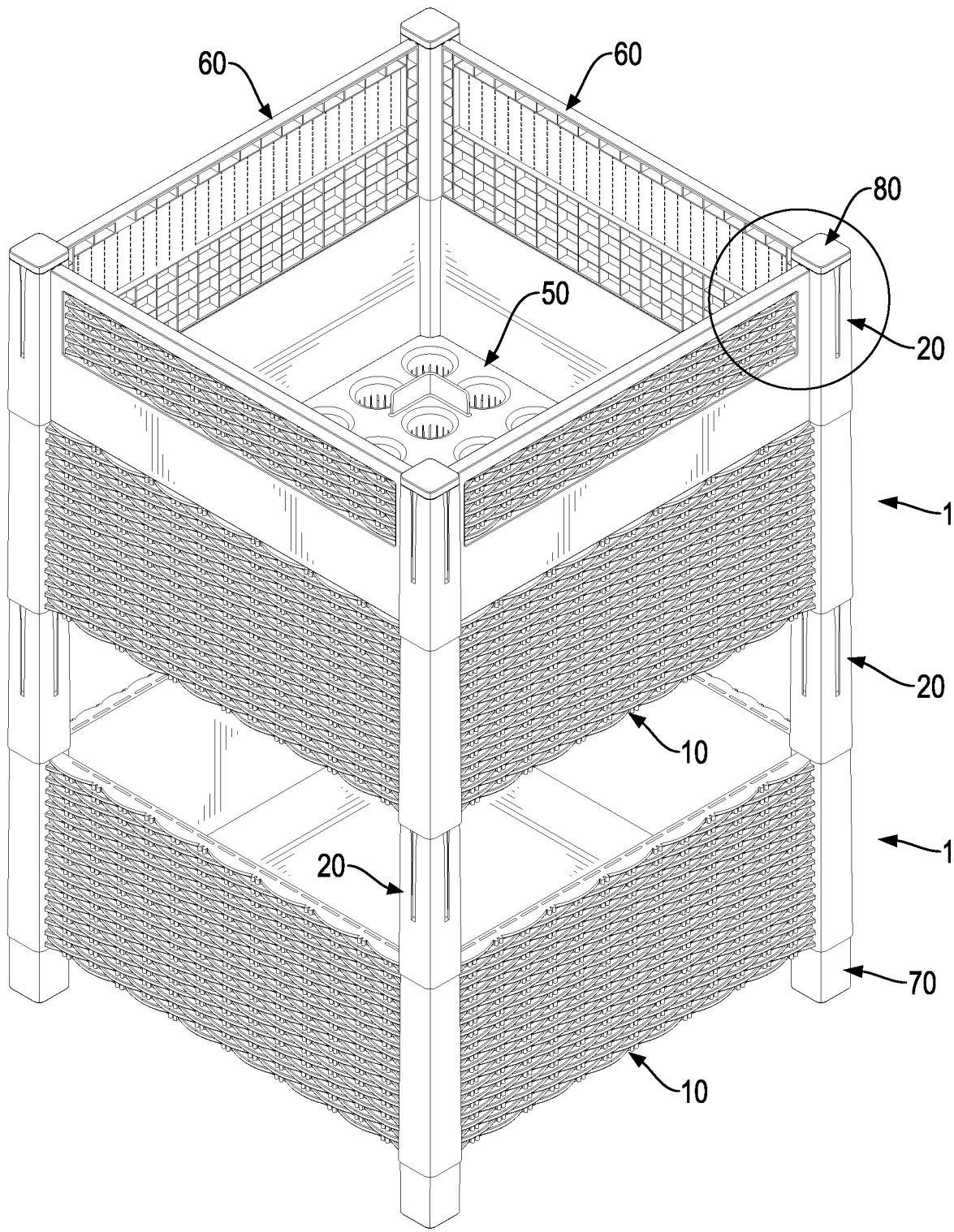
FIG. 1 is a perspective view of a first embodiment of the present invention showing two cultivation assemblies erectly assembled together.
Figure 2:
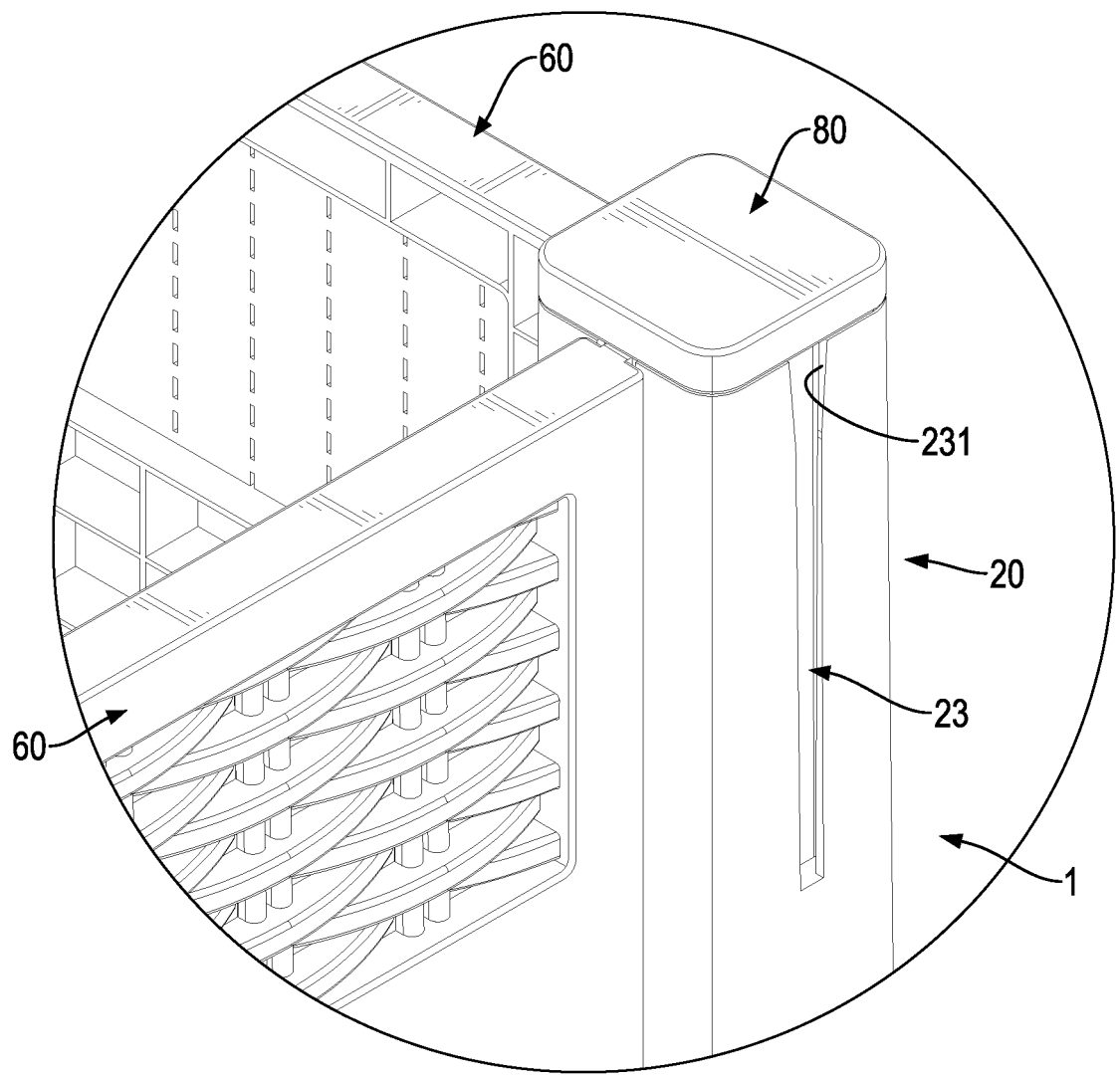
FIG. 2 is a partially enlarged perspective view of the first embodiment in FIG. 1.
Figure 3:
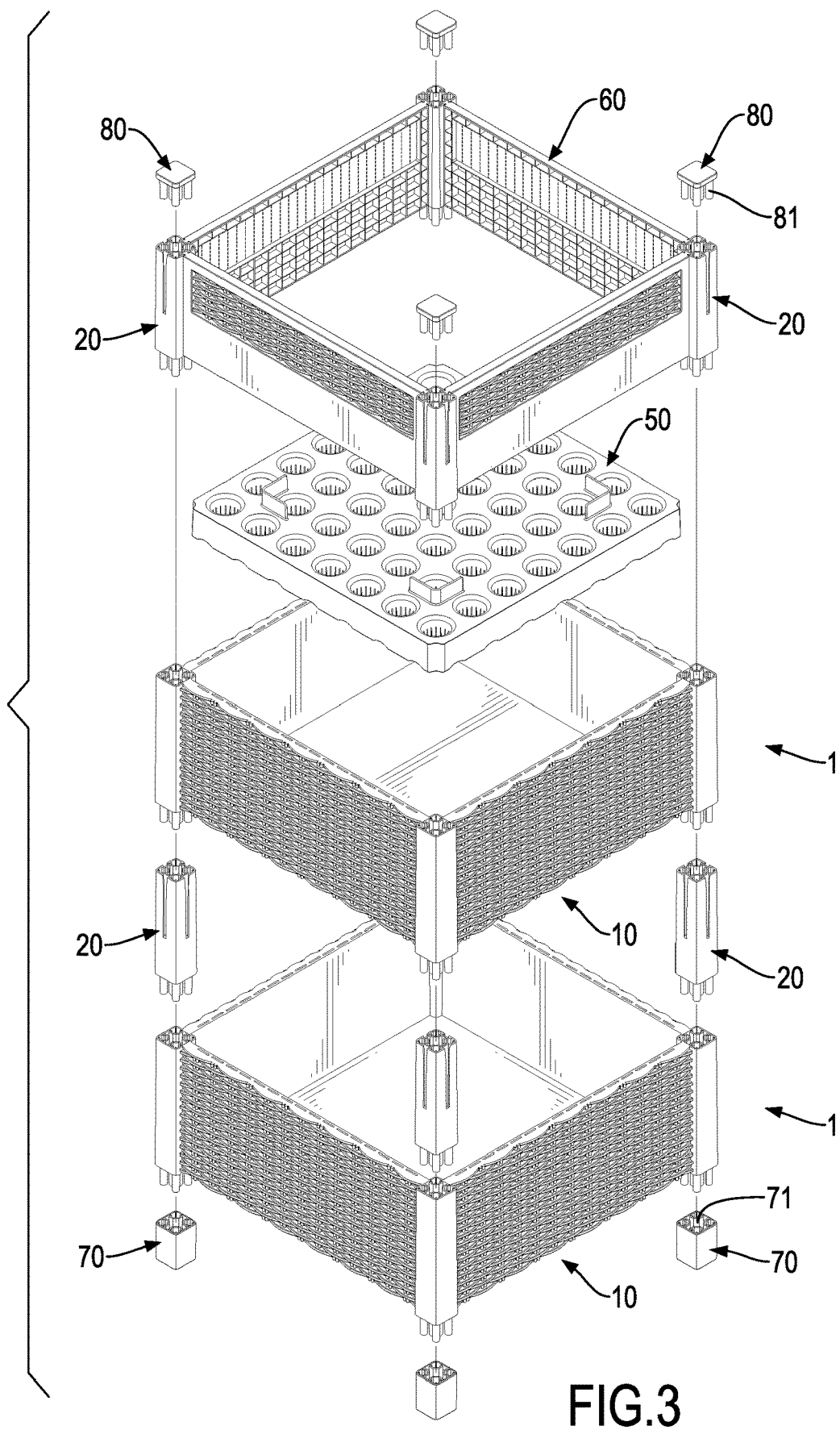
FIG. 3 is an exploded perspective view of the first embodiment in FIG. 1.

With reference to FIGS. 1 to 3, a first embodiment in accordance with the present invention has two cultivation assemblies 1. Each cultivation assembly 1 has a container 10. Each of the two cultivation assemblies has four connecting members 20.

With reference to FIGS. 3, 4, 5A, and 5B, the containers 10 of the two cultivation assemblies 1 are structurally identical to each other, and only one of the containers 10 is introduced hereafter for conciseness of description. The container 10 has a cross section, a bottom 11, a surrounding wall 12, and an opening 13. The cross section of the container 10 is rectangular and has four corners. The surrounding wall 12 is annular, is erectly formed on the bottom 11, and has four side plates 121 and four pillars 122. The four side plates 121 form a loop in a rectangular shape. Each one of the four side plates 121 has a top face and multiple combining holes 1211 defined in the top face of the side plate 121 at even intervals. The opening 13 of the container 10 is surrounded by the four side plates 121 of the surrounding wall 12 and is opposite to the bottom 11 in position.

In the first embodiment of the present invention, the amount of the containers 10 of each cultivation assembly 1 is one. Practically, the amount of the container 10 of each cultivation assembly 1 is not restricted. In the first embodiment of the present invention, the cross section of each container 10 is rectangular, the amount of the side plates 121 of the surrounding wall 12 of the container 10 is four, and the amount of the pillars 122 of the surrounding wall 12 of the container 10 is four. Practically, the shape of the cross section of each container 10 and the amounts of the side plates 121 and the pillars 122 are not restricted. The cross section of each container 10 may be triangular or other polygons.

Figure 4:
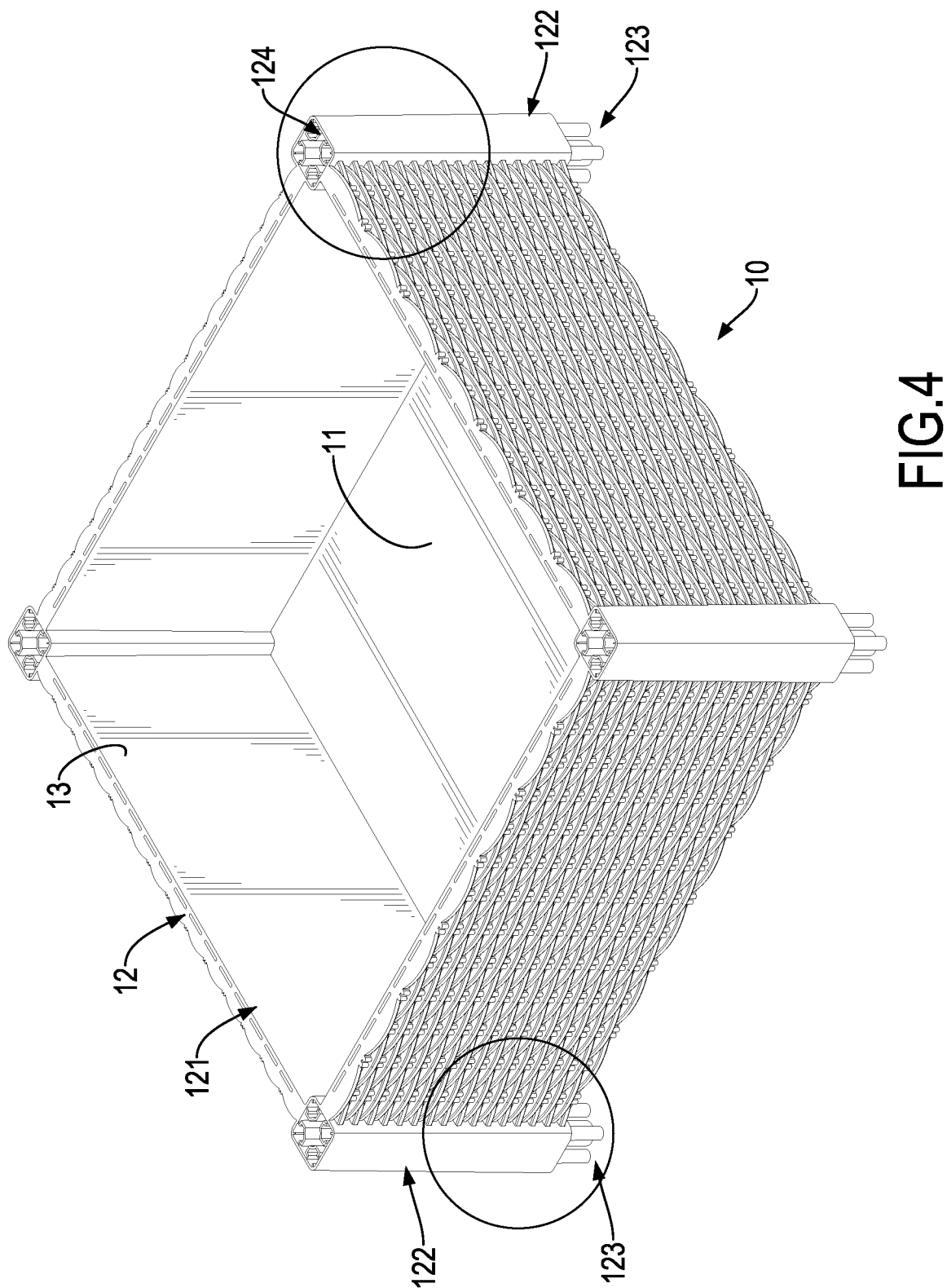
FIG. 4 is a perspective view of a container of one of the two cultivation assemblies of the first embodiment in FIG. 1.
Figure 5A:
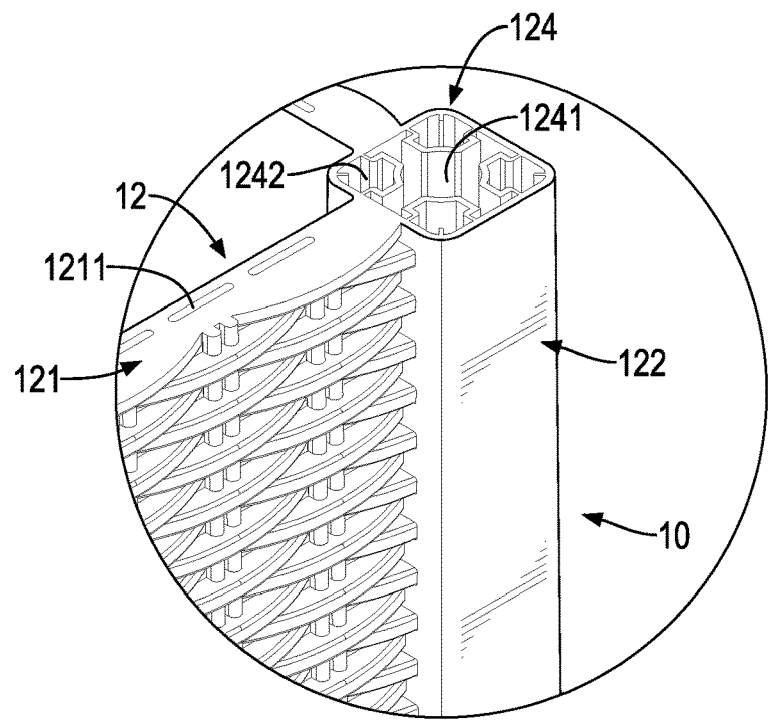
FIG. 5A is a partially enlarged perspective view of the container in FIG. 4.
Figure 5B:
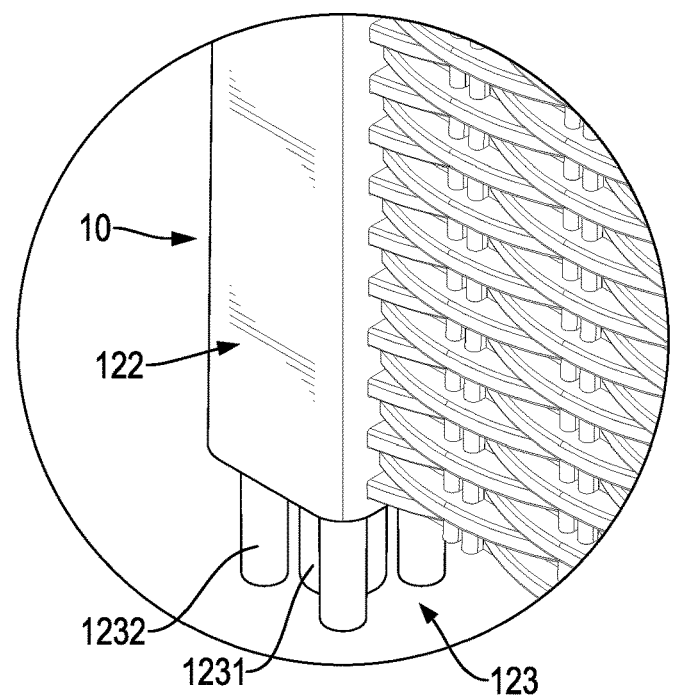
FIG. 5B is another partially enlarged perspective view of the container in FIG. 4.

With reference to FIGS. 4, 5A, and 5B, the four pillars 122 erectly extend from the bottom 11 to the opening 13 of the container 10 and are disposed at equiangular intervals. In the first embodiment, the four pillars 122 are respectively disposed in the four corners of the container 10. Each pillar 122 is disposed between adjacent two side plates 121. Each pillar 122 has a first end, a second end, a first connecting structure 123 and a second connecting structure 124. The first end and the second end of the pillar 122 are opposite in position. The first connecting structure 123 is disposed at the first end of the pillar 122. The second connecting structure 124 is disposed at the second end of the pillar 122. The first connecting structure 123 corresponds to the second connecting structure 124 in structure. The first connecting structure 123 of each pillar 122 is disposed adjacent to the bottom 11 of the container 10 and is implemented as five inserting sticks. The five inserting sticks are distinguished into a major inserting stick 1231 and four accessory inserting sticks 1232 surrounding the major inserting stick 1231 at equiangular intervals. The major inserting stick 1231 has a diameter larger than a diameter of each one of the four accessory inserting sticks 1232.

With reference to FIGS. 4, 5A, and 5B, the second connecting structure 124 of each pillar 122 is five inserting holes arranged according to the five inserting sticks of the first connecting structure 123 in structure and position. The five inserting holes are distinguished into a major inserting hole 1241 and four accessory inserting holes 1242 surrounding the major inserting hole 1241 at equiangular intervals. The major inserting hole 1241 has a diameter larger than a diameter of each one of the four accessory holes 1242.

In the first embodiment, the first connecting structure 123 of each one of the four pillars 122 has the five inserting sticks, and the second connecting structure 124 of each one of the four pillars 122 has the five inserting holes. Alternatively, the first connecting structure 123 of each one of the four pillars 122 may be five inserting holes, and the second connecting structure 124 of each one of the four pillars 122 may be five inserting sticks. The configurations of the first connecting structure 123 and the second connecting structure 124 of each pillar 122 are not restricted as long as the first connecting structure 123 corresponds to the second connecting structure 124 in structure.

Figure 6:
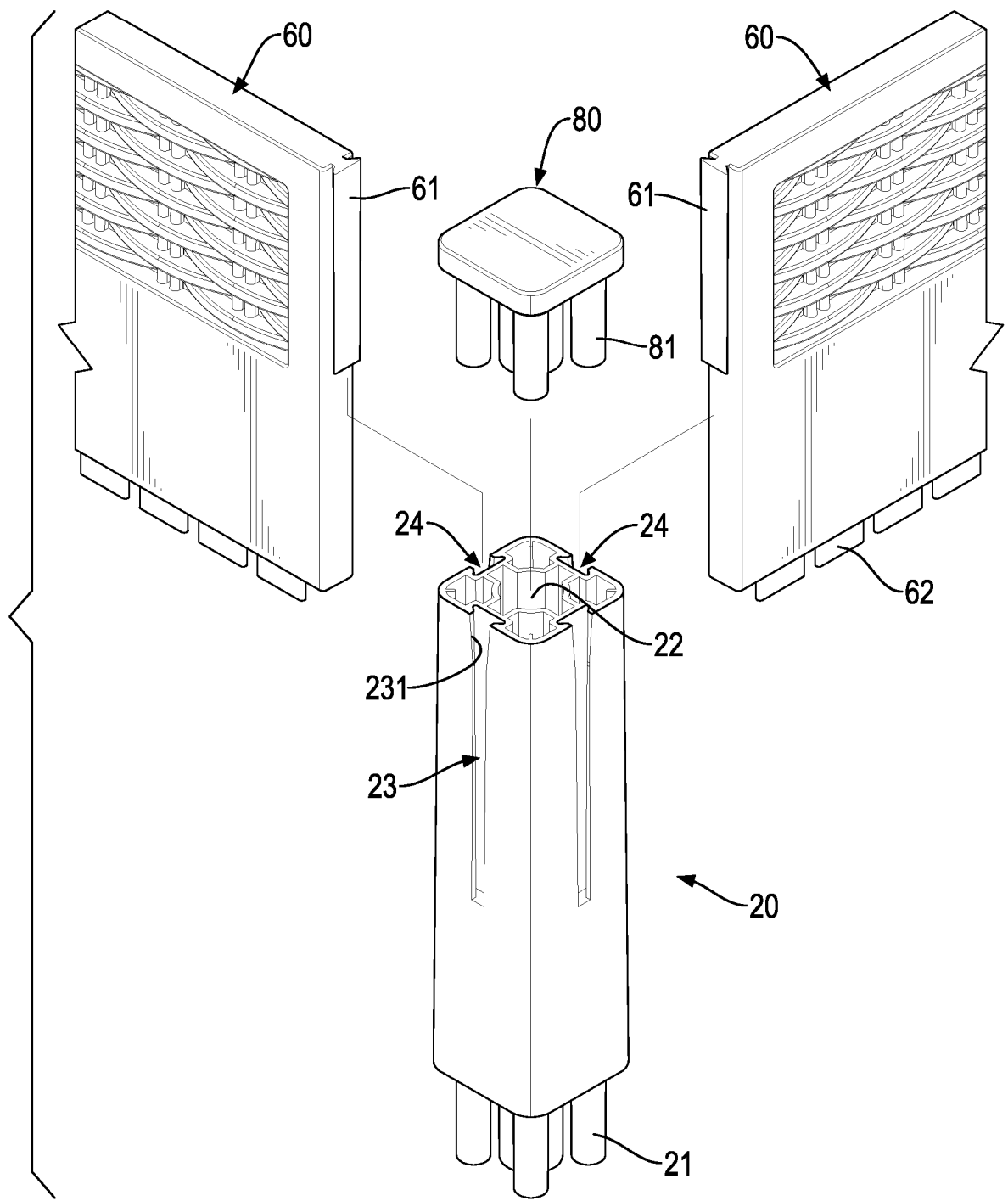
FIG. 6 is a partially exploded perspective view of the first embodiment in FIG. 1.
Figure 7A:
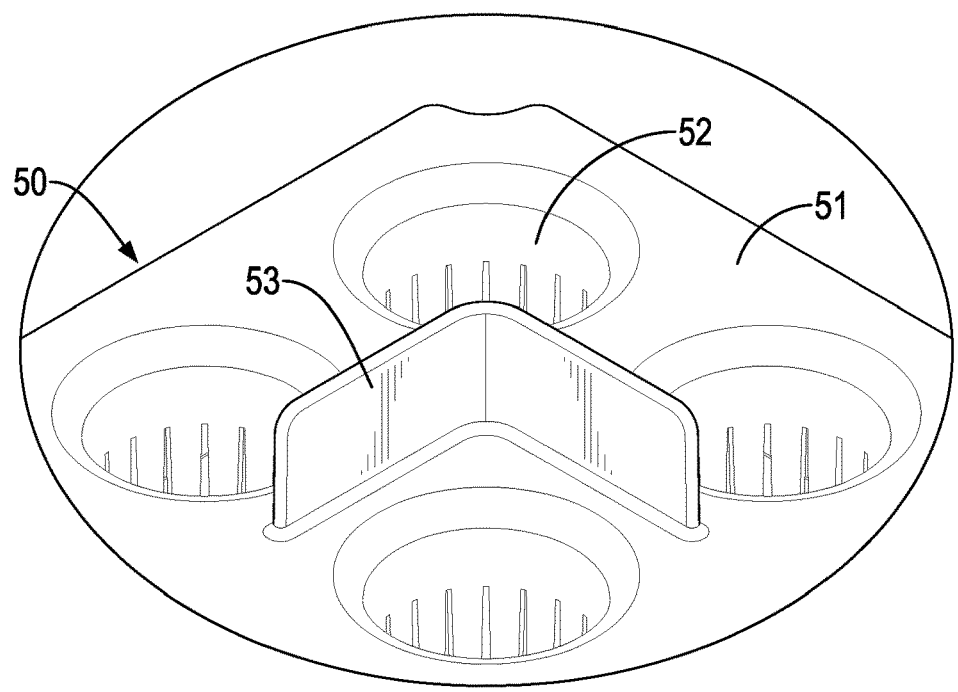
FIG. 7A is an enlarged perspective view of a drainage board of the first embodiment in FIG. 1.
Figure 7B:
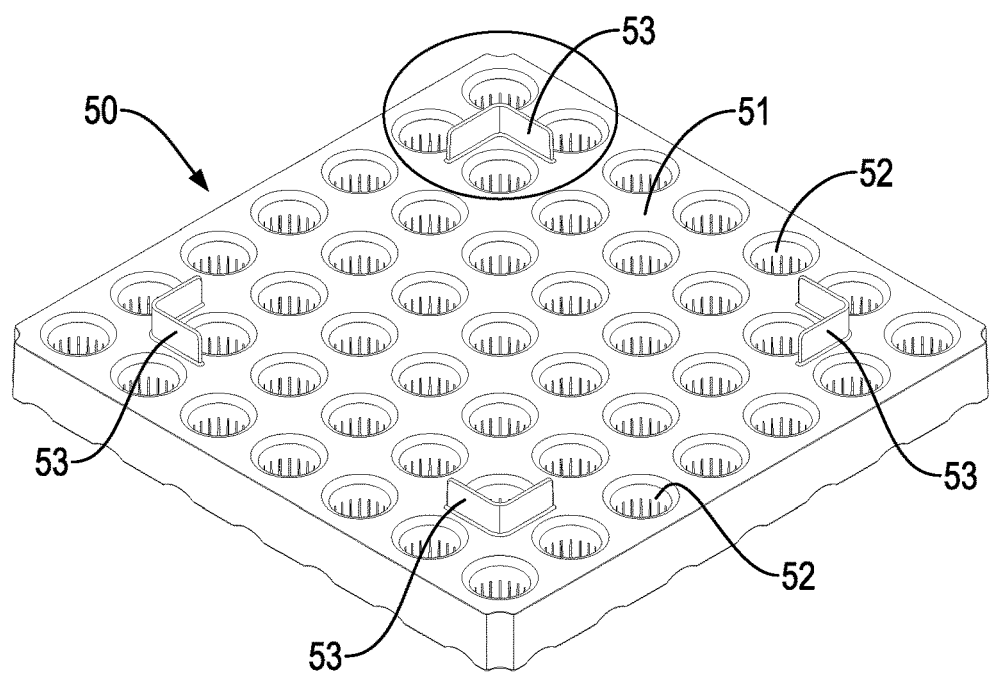
FIG. 7B is a perspective view of the drainage board of the first embodiment in FIG. 1.

With reference to FIG. 6, each connecting member 20 is a square column and has a peripheral surface, a first end, a second end, a first connecting structure 21, and a second connecting structure 22. The peripheral surface is composed of four surrounding side faces. The first end and the second end of the connecting member 20 are opposite in position. The first connecting structure 21 and the second connecting structure 22 are respectively disposed at the first end and the second end of the connecting member 20. The structure of the first connecting structure 21 of each connecting member 20 is same as the structure of the first connecting structure 123 of each pillar 122 and is implemented as five inserting sticks. The structure of the second connecting structure 22 of each connecting member 20 is same as that of the second connecting structure 124 of each pillar 122 and is implemented as five inserting holes capable of engaging with the five inserting sticks of one of the first connecting structures 123, 21.

With reference to FIGS. 1, 3, 4, and 6, the four first connecting structures 21 of the four connecting members 20 respectively engage with the four second connecting structures 124 of the four pillars 122. The first end of each connecting member 20 is disposed adjacent to the opening 13 of the container 10.

With reference to FIG. 6, each cultivation assembly 1 has at least one first engaging structure 23 facing outward with respect to the container 10. The at least one first engaging structure 23, 24 of each cultivation assembly 1 is formed on the four connecting members 20. Preferably, the amount of the first engaging structure 23, 24 formed on each connecting member 20 is four. The four first engaging structures 23, 24 are respectively formed in the four side faces of the peripheral surface of the connecting member 20. Two of the first engaging structures 23 are respectively formed in two of the four side faces of the peripheral surface of the connecting member 20. Said two of the first engaging structures 23 face outward with respect to the container 10. The other two of the first engaging structures 24 are respectively formed in the other two of the four side faces of the peripheral surface of the connecting member 20. In the first embodiment of the present invention, each first engaging structure 23, 24 is an extending dovetail groove having an expanding section 231 with a width gradually increasing toward the second end of the connecting member 20.

Figure 8:
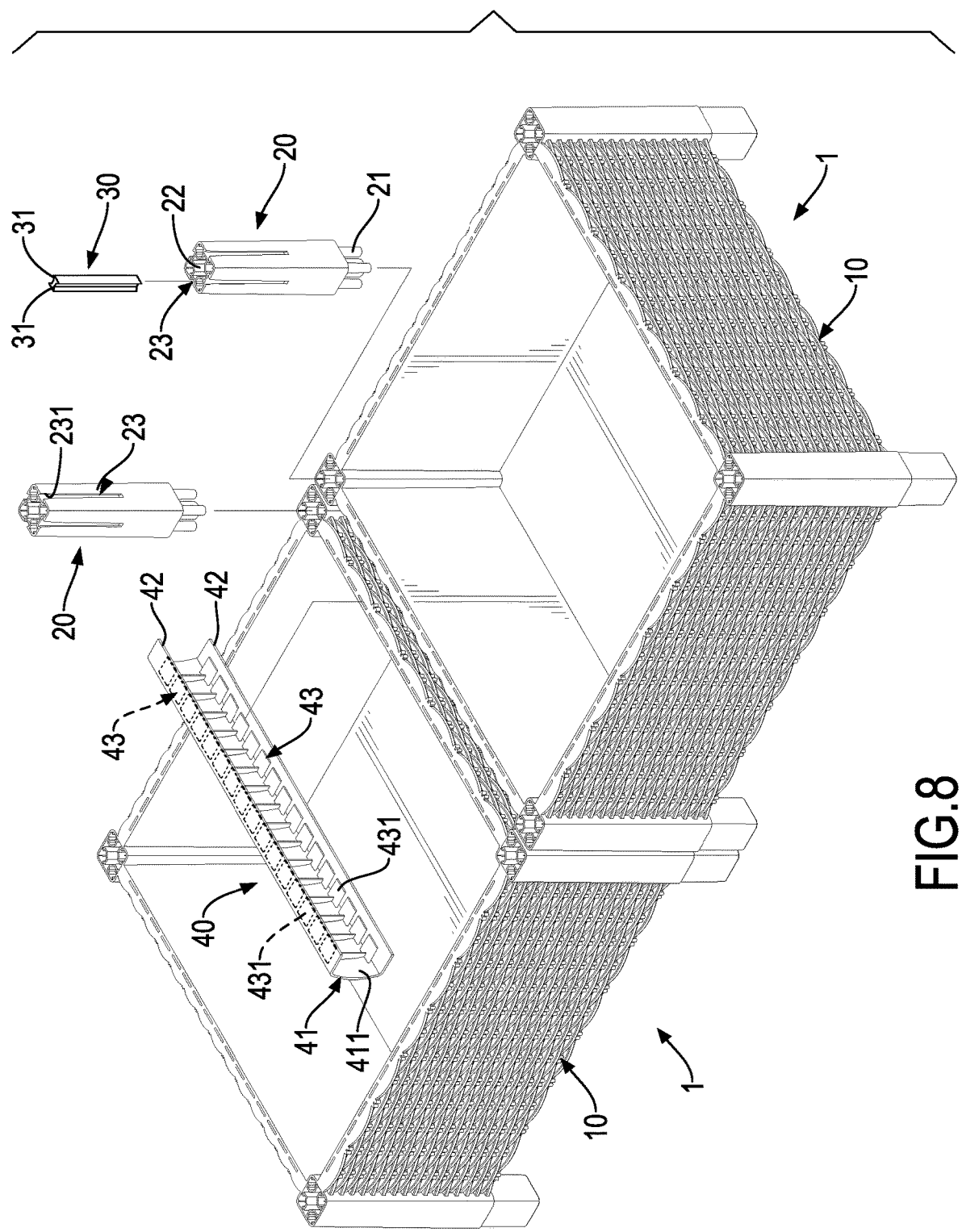
FIG. 8 is another exploded perspective view of the first embodiment in FIG. 1 showing two containers of the two cultivation assemblies connected side by side.

With reference to FIG. 8, each cultivation assembly 1 further has an engaging member 30. The engaging members 30 of the two cultivation assemblies 1 are structurally identical to each other, and only one of the engaging members 30 is introduced hereafter for conciseness of description. The engaging member 30 has two second engaging structures 31 facing opposite directions. Each second engaging structure 31 of the engaging member 30 is an elongated protrusion and has a dovetailed section corresponding to each first engaging structure 23, 24 implemented as an extending dovetail groove. The cross sections of each second engaging structure 23 and each first engaging structure 23, 24 may be circular or in any other polygonal shape as long as each first engaging structure 23, 24 is capable of engaging with the second engaging structure 31.

With reference to FIGS. 1, 3, 4, 6, and 8, the four first connecting structures 123 of the four pillars 122 of the container 10 of one of the two cultivation assemblies 1 are respectively connected to the four second connecting structures 22 of the four connecting members 20. The four connecting members 20 make the two containers 10 of the two cultivation assemblies 1 erectly assembled. The four connecting members 20 disposed between the two containers 10 separate the two containers 10 such that the lower one of the two containers 10 is provided with sufficient air and light. In the first embodiment of the present invention, the two cultivation assemblies 1 can be erectly assembled without any additional frame. Therefore, users can save money for purchasing the additional frame and time for assembling the additional frame.

With reference to FIGS. 3 and 8, one of the two cultivation assemblies 1 further has a combining unit 40, a cultivating base 50, and four fences 60. The combining unit 40 is elongated and has a top board 41, two side boards 42, and two engaging rows 43. The top board 41 has an elongating direction and an inner face 411. The two side boards 42 are connected to the inner face 411 of the top board 41 to form a U-shaped section. The two engaging rows 43 are formed on the inner face 411 of the top board 41 and are disposed between the two side boards 42. Each engaging row 43 has multiple engaging protrusions 431 arranged along the elongating direction of the top board 41. The amount of the multiple engaging protrusions 431 of each engaging row 43 corresponds to the amount of the multiple combining holes 1211.

With reference to FIG. 8, the two cultivation assemblies 1 are capable of being assembled side by side. One of the side plates 121 of the surrounding wall 12 of one of the two containers 10 fully abuts against one of the side plates 121 of the surrounding wall 12 of the other one of the two containers 10 to become two abutted side plates 121. Two of the connecting members 20 abut against each other to be defined as two abutted connecting members 20. The first engaging structure 23 formed on one of the two abutted connecting members 20 aligns with the first engaging structure 23 formed on the other one of the two abutted connecting members 20. One of the engaging members 30 is downward inserted between the two abutted connecting members 20. The two second engaging structures 31 of the engaging member 30 respectively engage with the two first engaging structures 23 respectively formed on the two abutted connecting members 20. Therefore, the two containers 10 of the two cultivation assemblies 1 are connected side by side. Then, the combining unit 40 is mounted on the two abutted side plates 121. The multiple combining protrusions 431 of one of the two combining rows 43 of the combining unit 40 are respectively inserted into the multiple combining holes 1211 of one of the two abutted side plates 121. The multiple combining protrusions 431 of the other one of the two combining rows 43 of the combining unit 40 are respectively inserted into the multiple combining holes 1211 of the other one of the two abutted side plates 121. The connection between the two containers 10 is enhanced by the combining unit 40. The expanding section 231 of the first engaging structure 23 disposed on each connecting member 20 is disposed adjacent to the second connecting structure 22 of the connecting member 20. The expanding section 231 provides a guiding function to each engaging member 30 and facilitates each engaging member 30 to be easily inserted between two of the connecting members 20.

Figure 9:
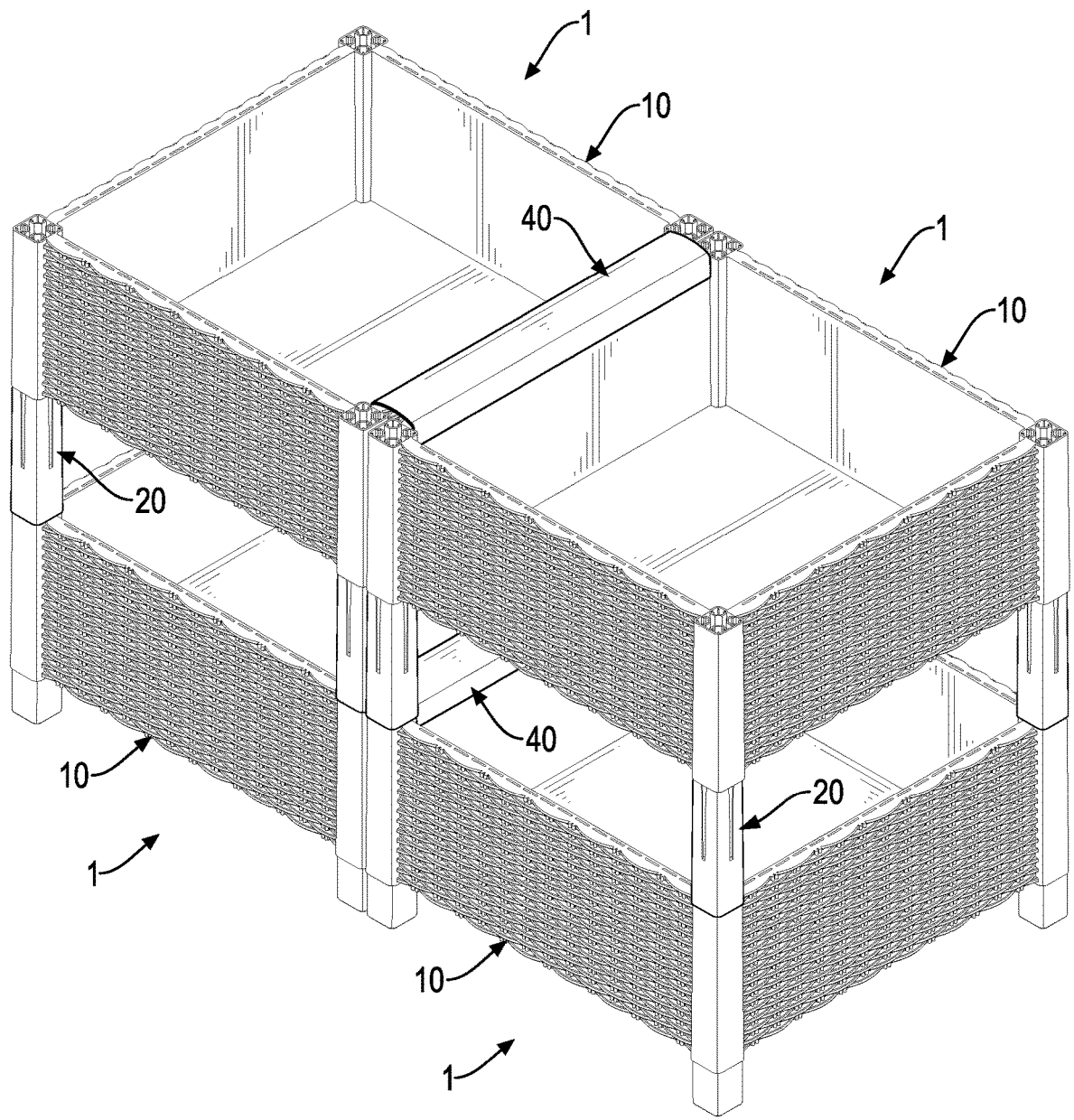
FIG. 9 is a perspective view of the first embodiment in FIG. 1 showing four cultivation assemblies connected together.

Practically, four containers 10 of four cultivation assemblies 1 are capable of being assembled as shown in FIG. 9. Two pairs of cultivation assemblies with two erectly assembled containers 10 are assembled side by side.

In the first embodiment of the present invention, the first engaging structures 23, 24 are disposed on the connecting members 20, the second engaging structures 31 are disposed on the engaging members 30, and the two containers 10 are assembled side by side by the connecting members 20 and the engaging members 30. Practically, the first engaging structures 23 and the second engaging structures 31 may be disposed on the connecting members 20. The two containers 10 may be connected side by side via the connecting members 20 with the first engaging structure 23, 24 and the connecting members 20 with the second engaging structures 31.

With reference to FIGS. 1, 3, 7A, and 7B, the cultivating base 50 is disposed within one of the containers 10. The cultivating base 50 has a top surface 51, multiple cavities 52, and four fetching portions 53. The multiple cavities 52 are separately defined in the top surface 51 of the cultivating base 50. The multiple cavities 52 are applied for receiving plant pots. Each two fetching portions 53 are separately disposed on the top surface 51 of the cultivating base 50 and are disposed diagonally. The user can stretch hands into the container 10 to grab two of the fetching portions 53 for moving the cultivating base 50 and the plant pots respectively received in the multiple cavities 52. In the first embodiment of the present invention, the cultivating base 50 has a rectangular outline corresponding to the cross section of each container 10 in shape. Each fetching portion 53 has an L shaped cross section and a cove. The two coves of the two fetching portions 53 disposed diagonally face to each other.

With reference to FIGS. 2, 5A, and 6, each fence 60 has two opposite ends, two second engaging structures 61, and multiple inserting protrusions 62. The two second engaging structures 61 are respectively disposed at the two opposite ends of the fence 60. The multiple inserting protrusions 62 are disposed on a bottom face of the fence 60. The multiple inserting protrusions 62 are arranged along the fence 60 and correspond to the multiple combining holes 1211 of one of the side plates 121 of the surrounding wall 12 of the container 10. The fence 60 is inserted between two adjacent connecting members 20 and the two second engaging structures 61 of the fence 60 are respectively engaged with the two first engaging structures 24 respectively disposed on the two connecting members 20. The multiple inserting protrusions 62 are respectively inserted into the multiple combining holes 1211 of one of the side plates 121 disposed below the fence 60. With reference to FIG. 1, the four fences 60 provide protection to the upper one of the two containers 10.

With reference to FIGS. 1 to 4, each pillar 122 of the surrounding wall 12 of the lower one of the two containers 10 is equipped with a foot cover 70. The foot cover 70 has a second connecting structure 71 corresponding to each first connecting structure 123, 21 in structure. The second connecting structure 71 has five inserting holes capable of engaging with the five inserting sticks. The five inserting holes of the second connecting structure 71 of the foot cover 70 are respectively disposed on and around the five inserting sticks of the first connecting structure 123 of one of the pillars 122. In the first embodiment of the present invention, the four pillars 122 of the lower one the two containers 10 are respectively equipped with four foot covers 70. Therefore, the first embodiment can be placed on a horizontal plane stably.

With reference to FIGS. 1 to 3 and 6, each connecting member 20 connected to the upper one of the two containers 10 is equipped with a dust cover 80 with a first connecting structure 81 being capable of engaging with one of the second connecting structures 124, 22. The first connecting structure 81 has five inserting sticks corresponding to the five inserting holes of each second connecting structure 124, 22. The five inserting sticks are respectively inserted into the five inserting holes of each second connecting structure 22 of one of the connecting members 20. In the first embodiment of the present invention, the four second connecting structures 22 of the four connecting members 20 are respectively equipped with four dust covers 80 to prevent foreign objects from entering into the connecting structure 22 of each connecting member 20.

Figure 10:
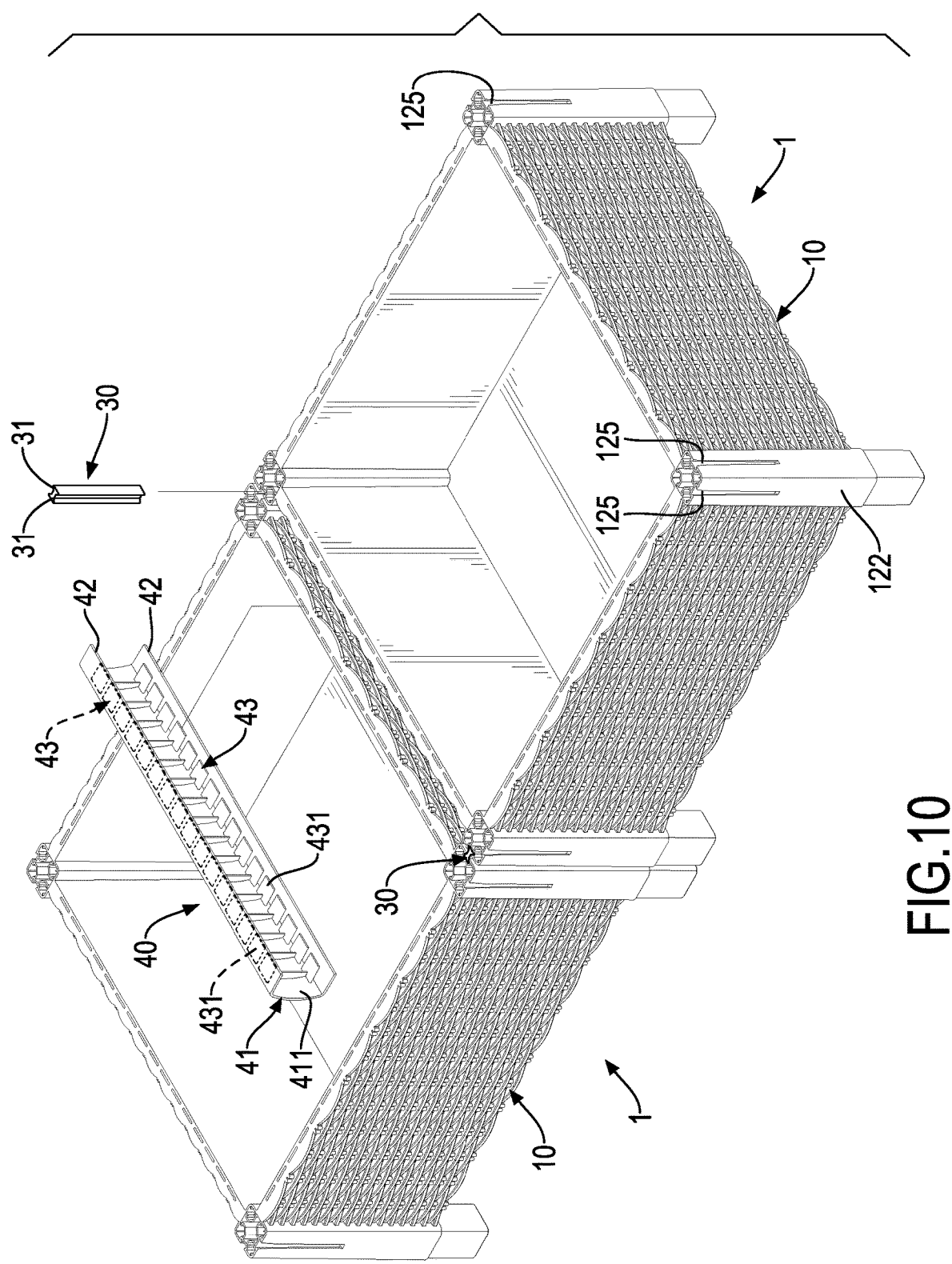
FIG. 10 is a partially exploded perspective view of a second embodiment in accordance with the present invention.

With reference to FIG. 10, a second embodiment of the present invention is substantially same as the first embodiment and has a container 10 and two engaging members 30. In the second embodiment, the four connecting members 20 are omitted. Each pillar 122 further has two first engaging structures 125. Each first engaging structure 125 is an elongated groove formed in a peripheral surface of the pillar 122 and has an expanding section gradually expanding toward the second end of the pillar 122. That is, the expanding section of each first engaging structure 125 gradually expands toward the opening 13 of the container 10. In the second embodiment, each engaging member 30 also has two second engaging structures 31 capable of engaging with one of the first engaging structures 125.

Figure 11:
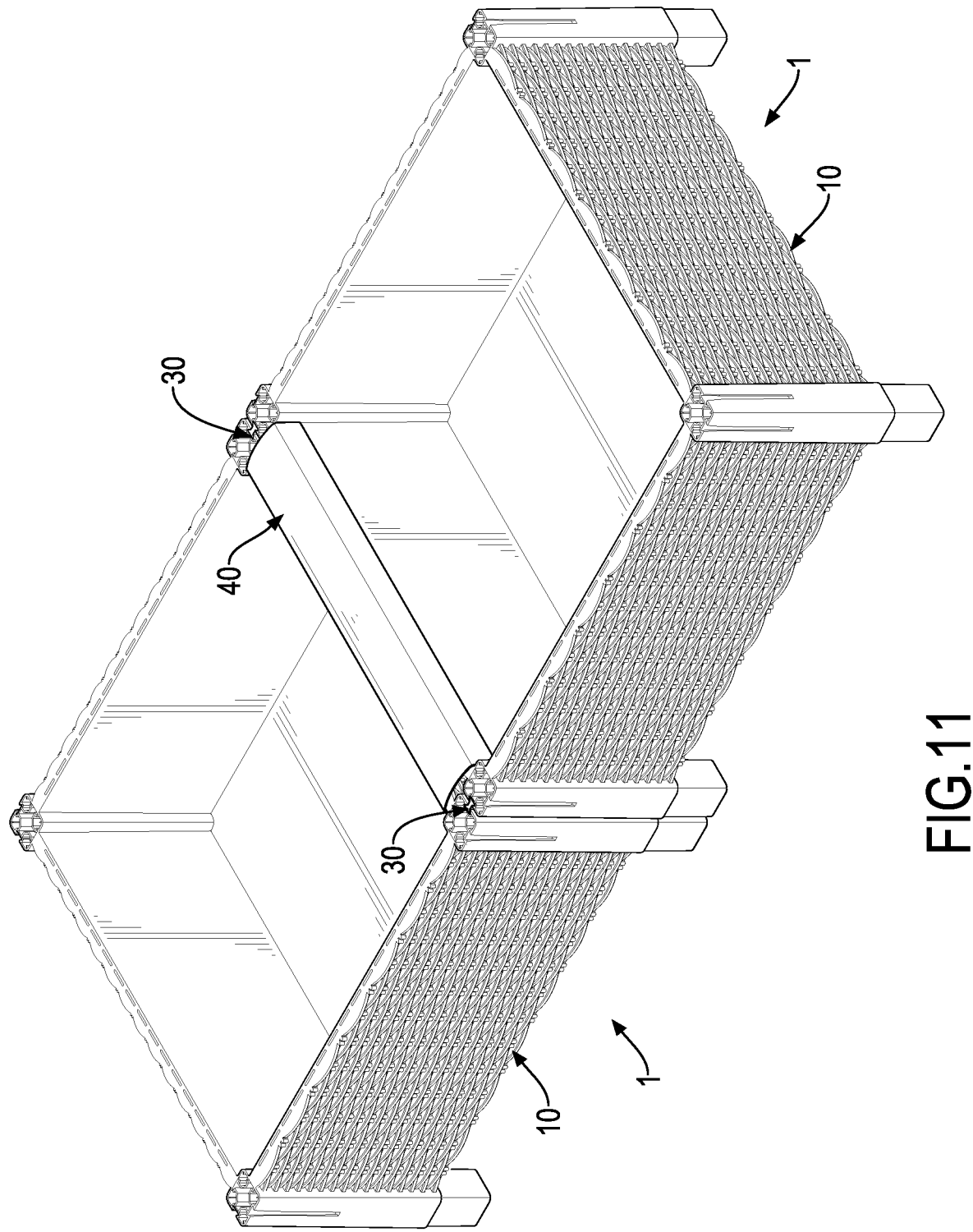
FIG. 11 is a perspective view of the second embodiment in FIG. 10 showing the two cultivation assemblies connected side by side.

With reference to FIGS. 10 and 11, to assemble the two containers 10 side by side, the two containers 10 are juxtaposed in advance. Two adjacent pillars 122 of one of the two containers 10 respectively abut against the two adjacent pillars 122 of the other one of the two containers 10, wherein the two first engaging structures 125 respectively disposed on the two adjacent pillars 122 of one of the two containers 10 are respectively aligned with the two first engaging structures 125 respectively disposed on the two adjacent pillars 122 of the other one of the two containers 10. The two engaging members 30 are downward inserted between the two containers 10. The two second engaging structures 31 of one of the two engaging members 30 respectively engage with the two first engaging structures 125. Therefore, the two containers 10 can be assembled side by side.

Figure 12:
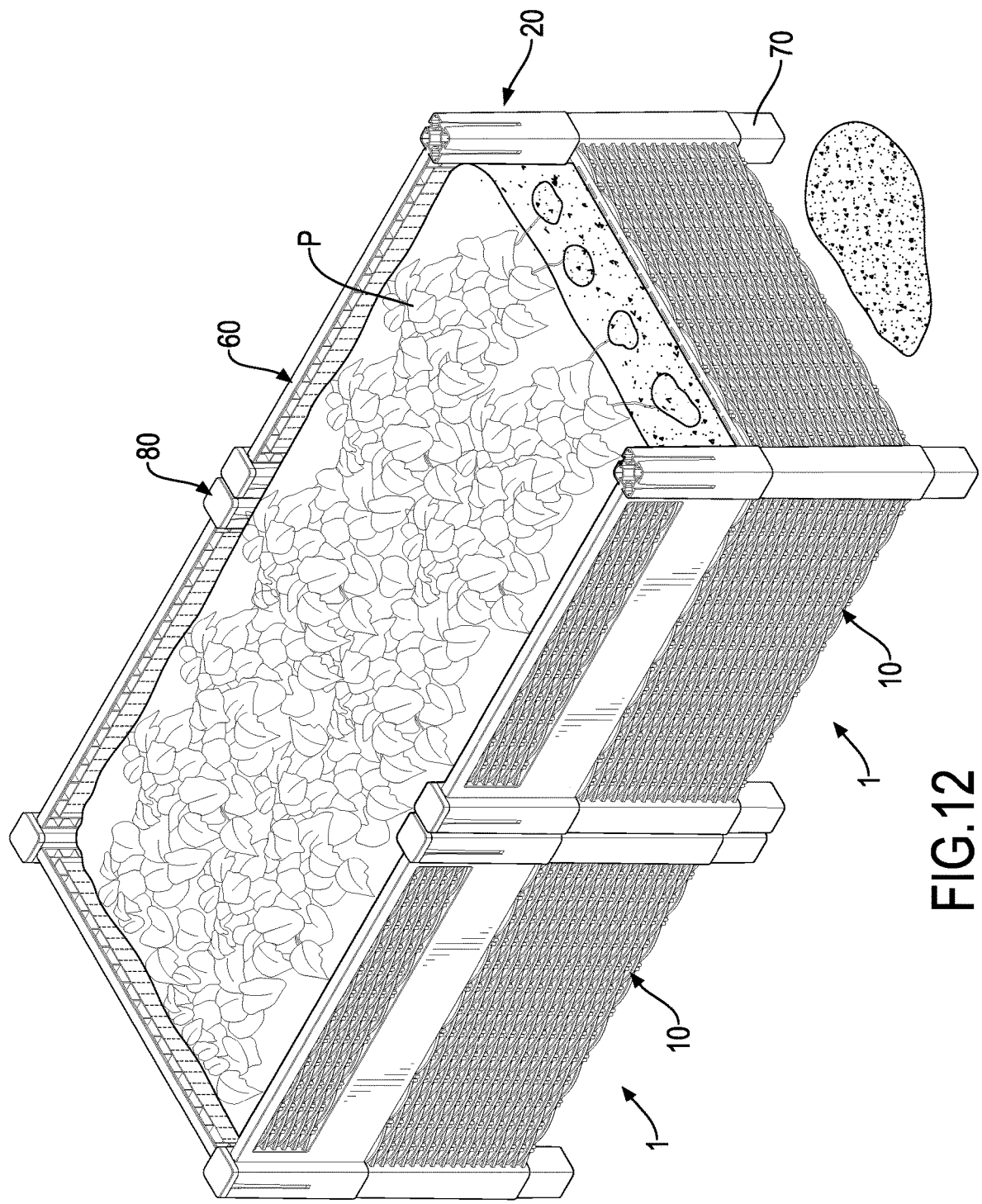
FIG. 12 is an operational perspective view of the present invention showing that the present invention is applied to cultivate a plant horizontally growing.
Figure 13:
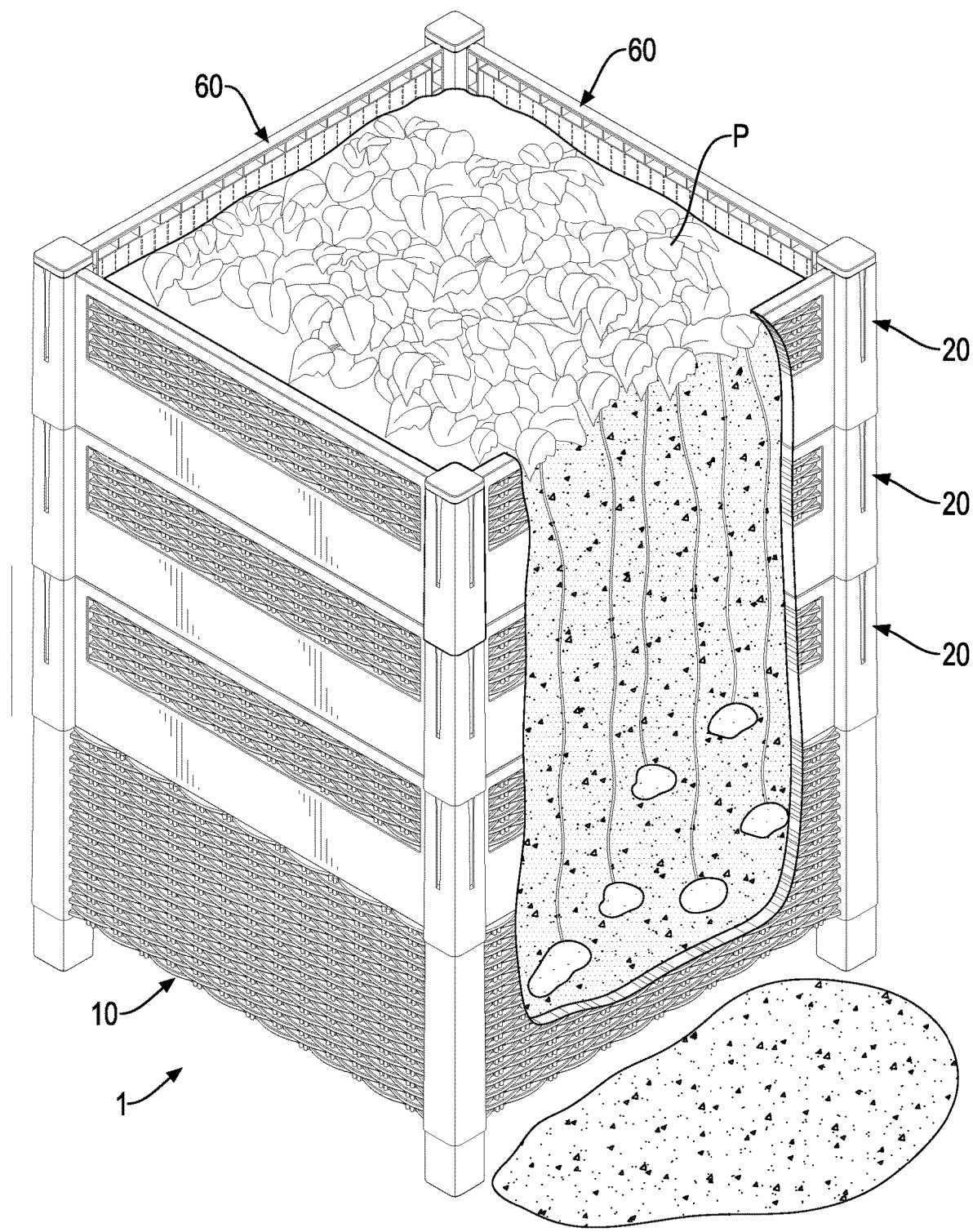
FIG. 13 is another operational perspective view in partial section of the present invention showing that the present invention is applied to cultivate a plant longitudinally growing.

With reference to FIGS. 12 and 13, the present invention is capable of planting sweet potatoes or potatoes P. With reference to FIG. 12, the fences 60 of the present invention not only provide protection to the container 10, but also can be utilized to hold soil for providing the growing plant with a longitudinal space. The fences 60 provide the plant with a sufficient rooting depth. The plant can grow without being limited by the height of the surrounding wall 12 of each container 10. Therefore, with reference to FIG. 12, the present invention is suitable for planting potatoes P. In addition, the two containers 10 assembled side by side provide the plant with a horizontal space for growing. Therefore, the present invention is also suitable for planting sweet potatoes with stolon extending horizontally. With reference to FIG. 12, one of the fences 60 can be removed for removing the soil held by the fence 60. The sweet potatoes P are exposed, which is convenient for harvesting.

With reference to FIG. 13, the amount of the fences 60 may be twelve. The twelve fences 60 are divided into three sets, and each set has four fences 60. The three sets of the fences 60 are erectly assembled. And each set can hold soil. The three sets of fences 60 provide rhizome of the potatoes P with much more soil for growing. The number of nodes of the rhizomes of the potato P increases, and the number of tubers of the potatoes P increases accordingly. Therefore, the three sets of the fences 60 erectly assembled facilitate ease in harvesting of the potatoes P.

Figure 14:
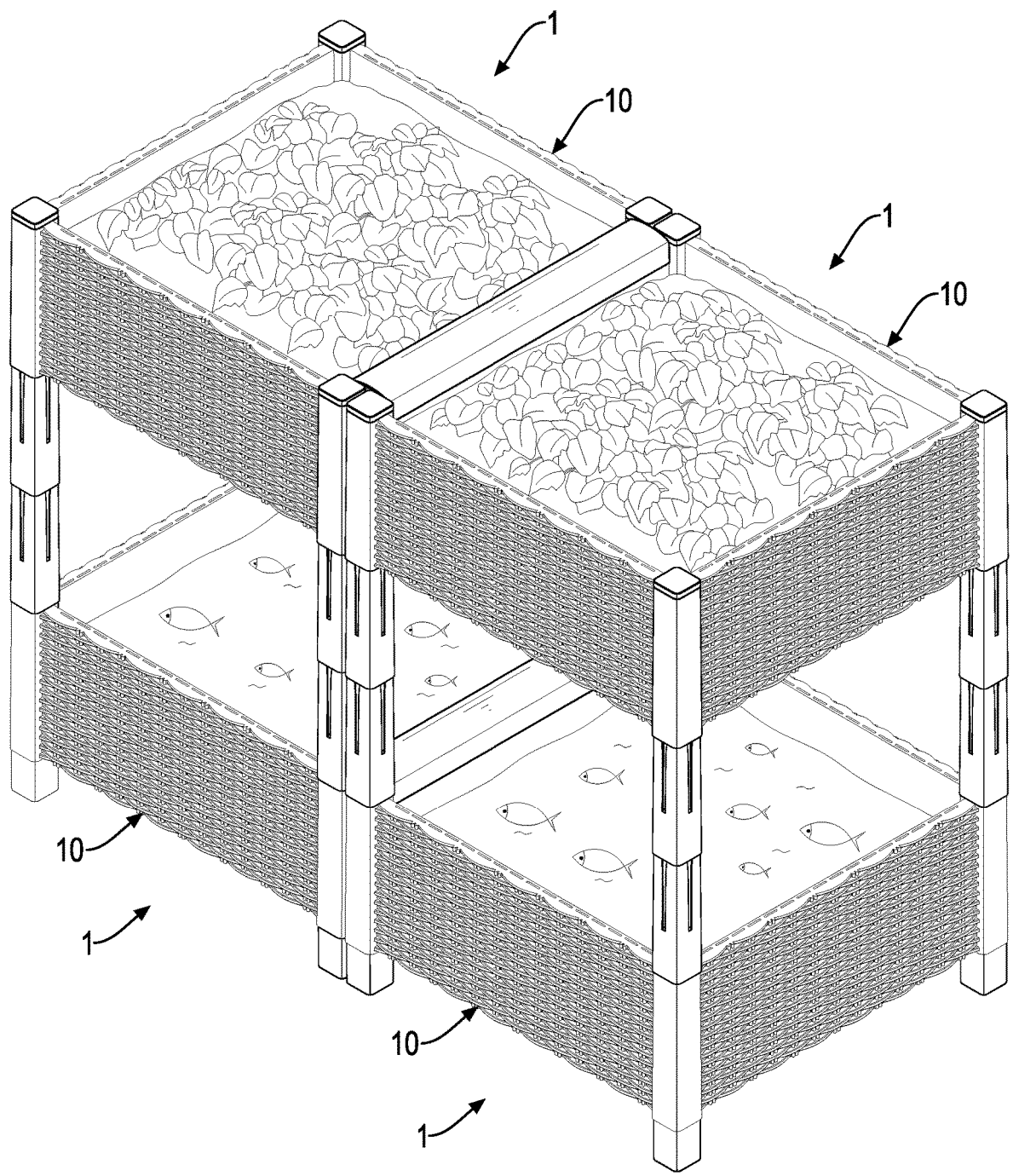
FIG. 14 is another operational perspective view of the present invention showing that the present invention is applied to cultivate both plants and fishes.

With reference to FIG. 14, the engaging members 30 of each cultivation assembly 1 can be used to assemble two containers 10 side by side. The upper containers 10 in FIG. 14 can be applied to cultivate plants. The lower containers 10 in FIG. 14 can be applied to cultivate fish, shrimp, or other small animals. Water in the upper containers 10 and the lower containers 10 can recycle via an additional recycling system. Therefore, nitrogen and phosphorus in excretion of the fish and shrimp cultivated in the lower containers 10 are transmitted to the upper containers 10 and are provided to the plants in the upper containers 10 as source of nutrition. With the additional recycling system, the present invention can be applied for aquaponics.

Figure 15:
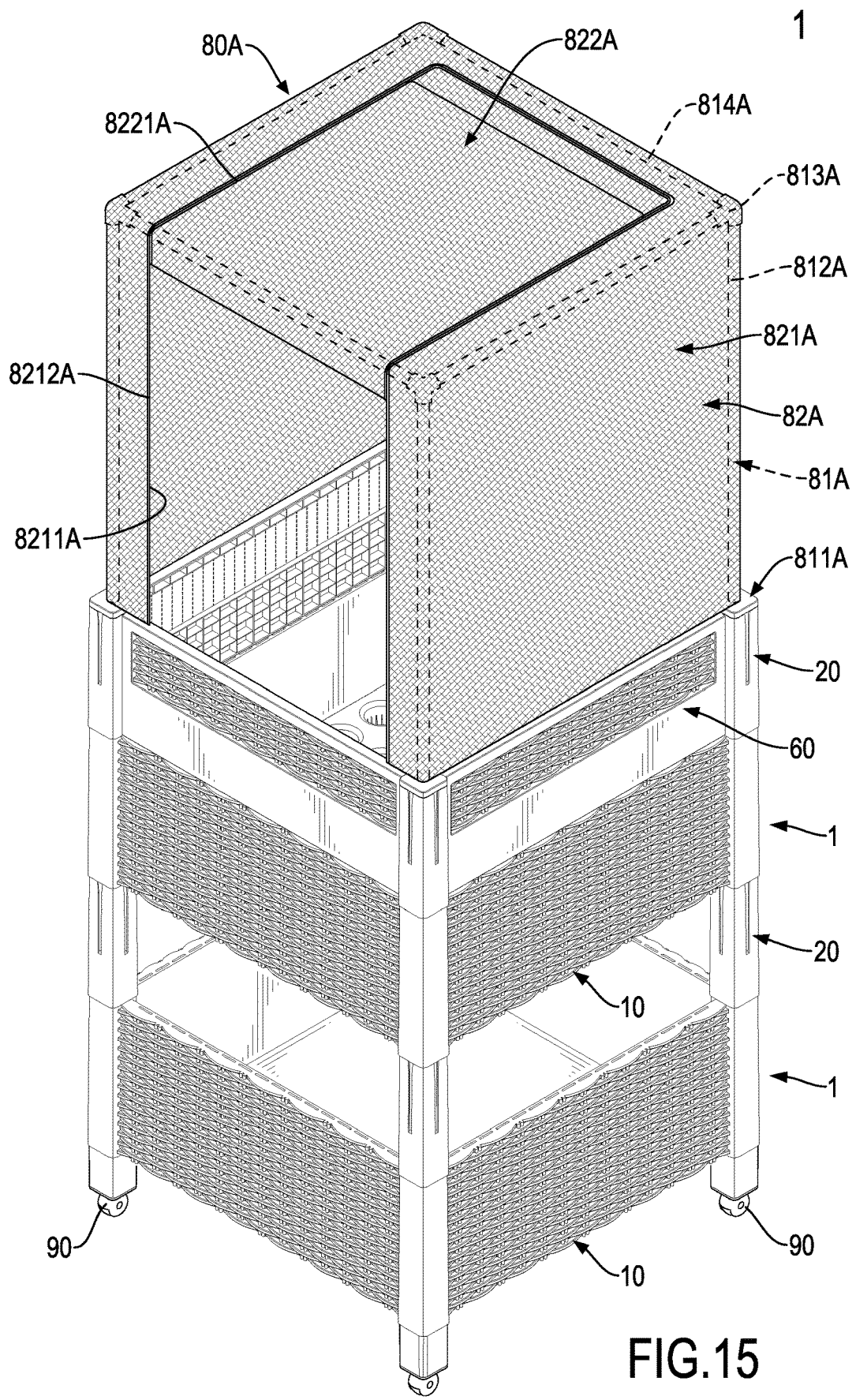
FIG. 15 is a perspective view of a third embodiment in accordance with the present invention.
Figure 16:
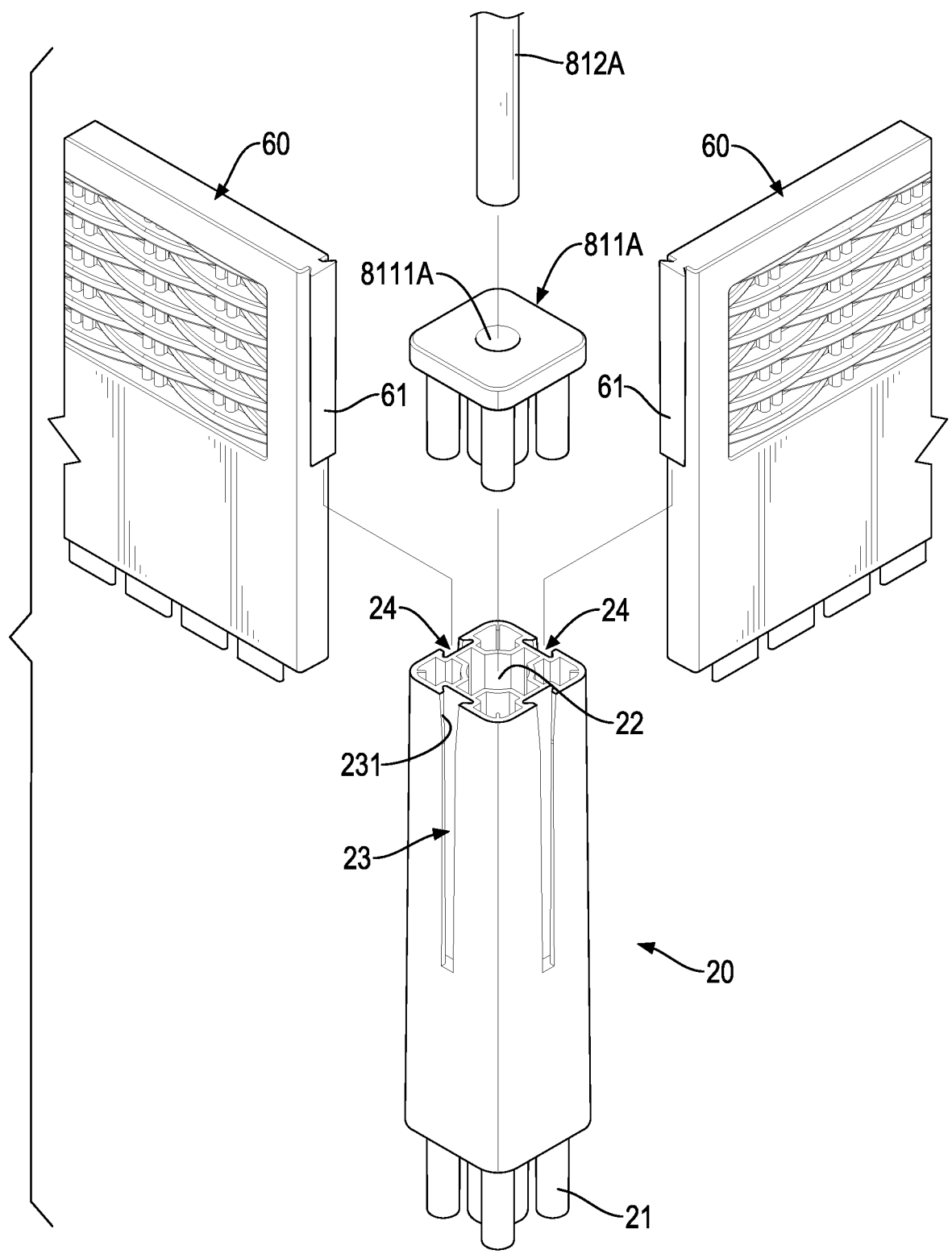
FIG. 16 is a partially exploded perspective view of the third embodiment in FIG. 15.

With reference to FIGS. 15 and 16, a third embodiment of the present invention is substantially same as the first embodiment and further has a cover set 80A and four casters 90.

The cover set 80A has a supporting frame 81A and a mesh cover 82A. The supporting frame 81A is connected to the four connecting members 20 of the upper cultivation assembly 1 in FIG. 15. The supporting frame 81A has four assembling components 811A, four erecting bars 812A, four connecting components 813A, and four lateral bars 814A. The four assembling components 811A are respectively connected to the four connecting members 20. Each assembling component 811A has a fixing hole 8111A. The four erecting bars 812A are respectively inserted into the four fixing holes 8111A of the four assembling components 811A and are disposed erectly. The four connecting components 813A are respectively mounted on the four erecting bars 812A and are respectively distant to the four assembling components 811A. Each lateral bar 814A is connected to two adjacent connecting components 813A.

The mesh cover 82A is mounted on the supporting frame 81A and covers the container 10 of the upper cultivation assembly 1. The mesh cover 82A has a main body 821A and a door 822A. The main body 821A has an inlet 8211A and a first fastening unit 8212A. The door 822A is integrally formed on the main body 821A, is capable of covering the inlet 8211A of the main body 821A, and has a second fastening unit 8221A. The first fastening unit 8212A and the second fastening unit 8221A can be connected mutually and may be zippers or hook and loop fasteners.

The cover set 80A can block insect pests and protect the container 10 of the upper cultivation assembly 1 from invasion of insect pests. The door 822A of the mesh cover 82A is convenient for opening and closing. Therefore, the plants inside the container 10 can be easily accessed.

Each caster 90 has a second connecting structure capable of engaging with one of the first connecting structures 123, 21 and has five inserting holes corresponding to the five inserting sticks of the first connecting structure 123, 21 in structure. The four casters 90 are connected to the container 10 of the lower cultivation assembly 1 in FIG. 15. The four second connecting structures of the four casters 90 are respectively assembled with the four first connecting structures 123 of the four pillars 122 of the container 10 of the lower cultivation assembly 1. The four casters 90 make the present invention easy and convenient to move.

Figure 17:
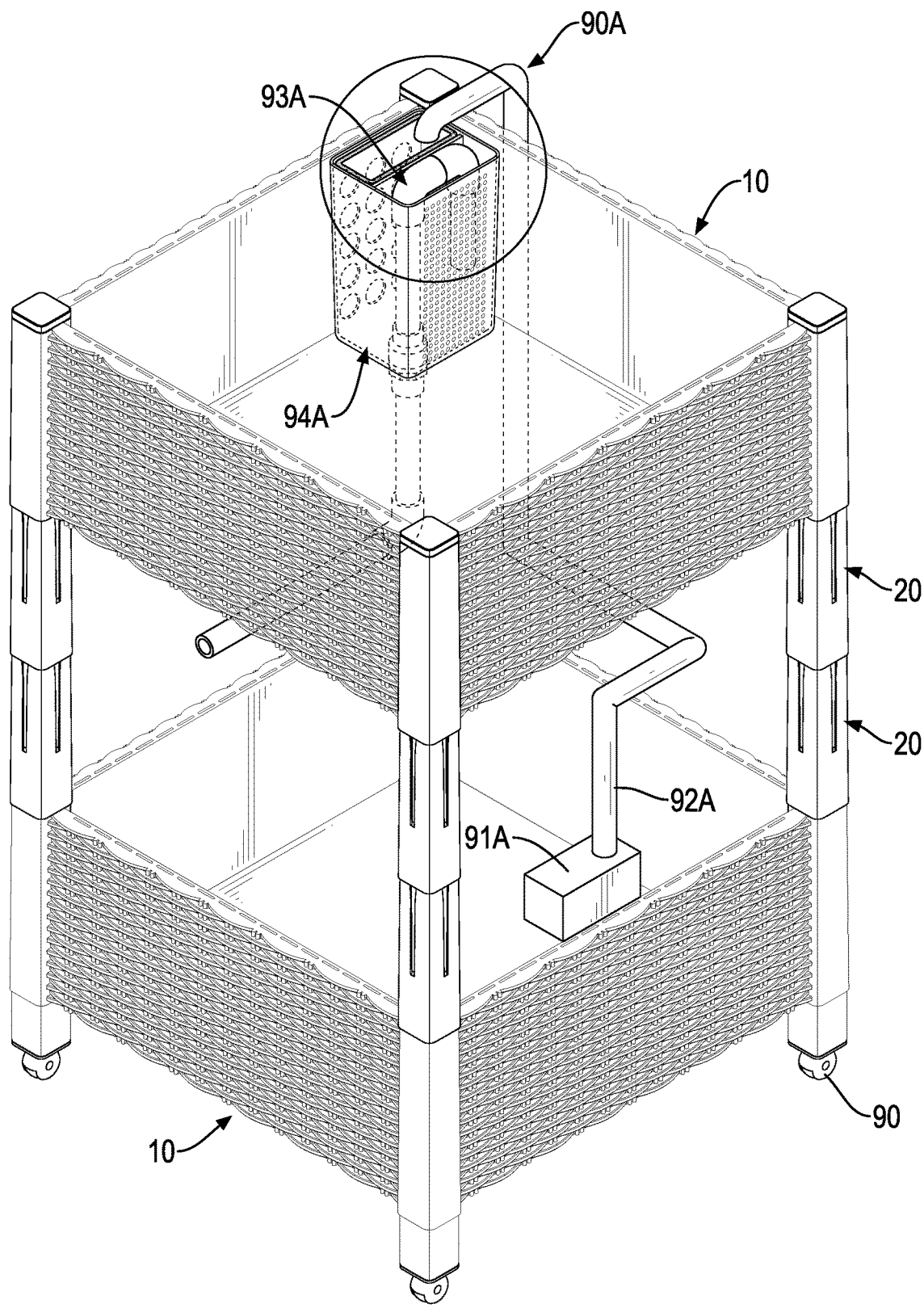
FIG. 17 is a perspective view of a fourth embodiment in accordance with the present invention.
Figure 18:
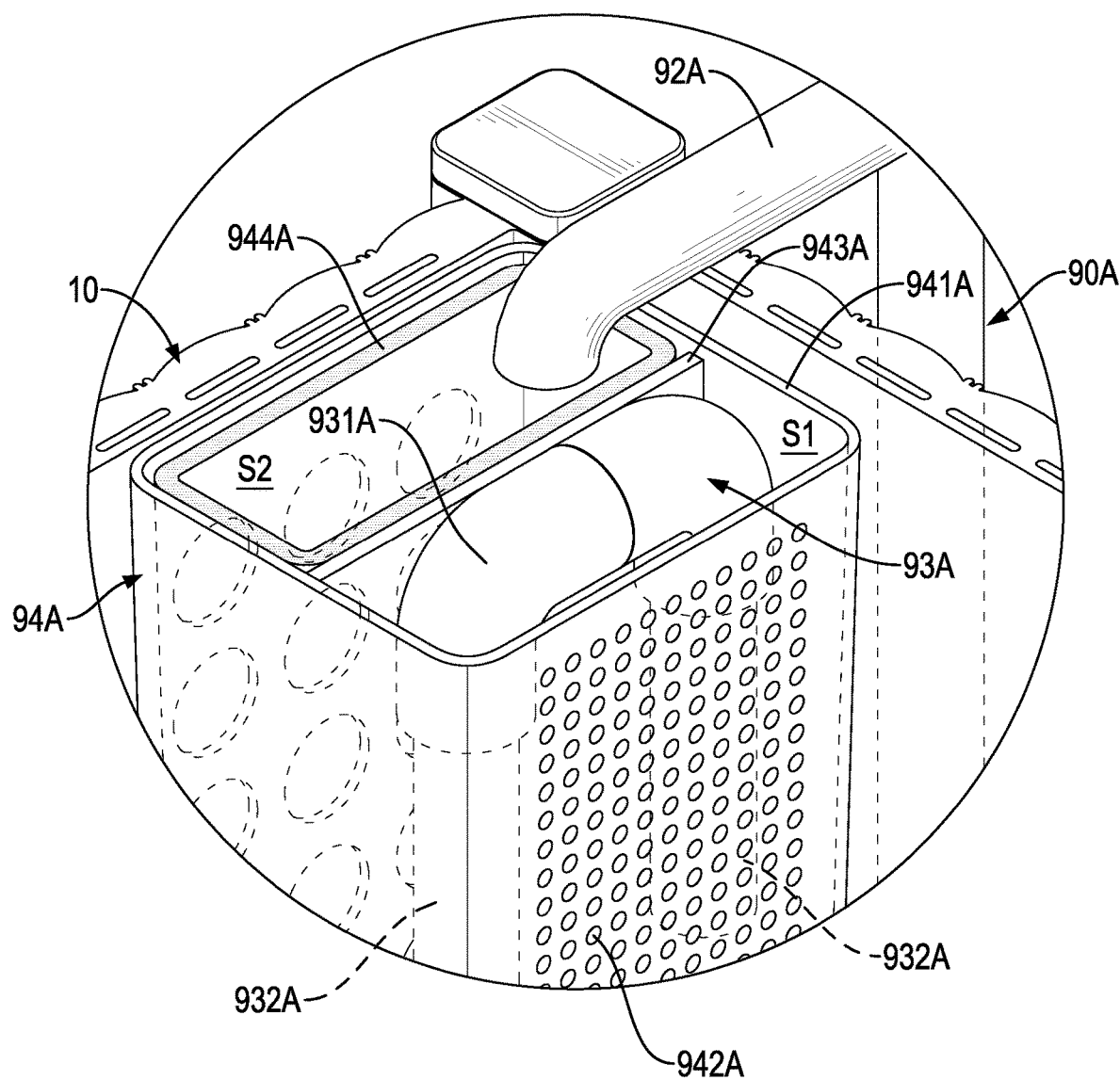
FIG. 18 is a partially enlarged perspective view of the fourth embodiment.

With reference to FIGS. 17 and 18, a fourth embodiment is substantially same as the first embodiment and further has a recycling system 90A. The recycling system 90A has a pump 91A, a conducting pipe 92A, an introducing set 93A, and a filtering box 94A. The pump 91A is disposed within the container 10 of the lower cultivation assembly 1 in FIG. 17. The conducting pipe 92A has two opposite ends. One of the two opposite ends of the conducting pipe 92A communicates with the pump 91A. The other end of the conducting pipe 92A communicates with the inside of the container 10 of the upper cultivation assembly 1 in FIG. 17. The introducing set 93A communicates with the two containers 10 and has a curved section 931A and two straight sections 932A. The curved section 931A has two opposite ends. The two straight sections 932A are respectively connected to the two opposite ends of the curved section 931A. One of the two straight sections 932A passes through the container 10 of the upper cultivation assembly 1 and reaches the inside the container 10 of the lower cultivation assembly 1 to make the two containers 10 communicate with each other. The other one of the two straight sections 932A communicates with the inside of the container 10 of the upper cultivation assembly 1. The filtering box 94A has an annular wall 941A, multiple filtering holes 942A defined through the annular wall 941A, a dividing plate 943A erectly disposed within the annular wall 941A, a first space S1 and a second space S2 divided by the dividing plate 943A, and a filtering sponge 944A. The filtering box 94A is disposed within the container 10 of the upper cultivation assembly 1. The conducting pipe 92A communicates with the second space S2 of the filtering box 94A and communicates with the inside of the container 10 of the upper cultivation assembly 1 via the second space S2. The introducing set 93A is disposed within the first space S1 of the filtering box 94. The filtering sponge 944A is disposed within the second space S2 of the filtering box 94A.

Figure 19:
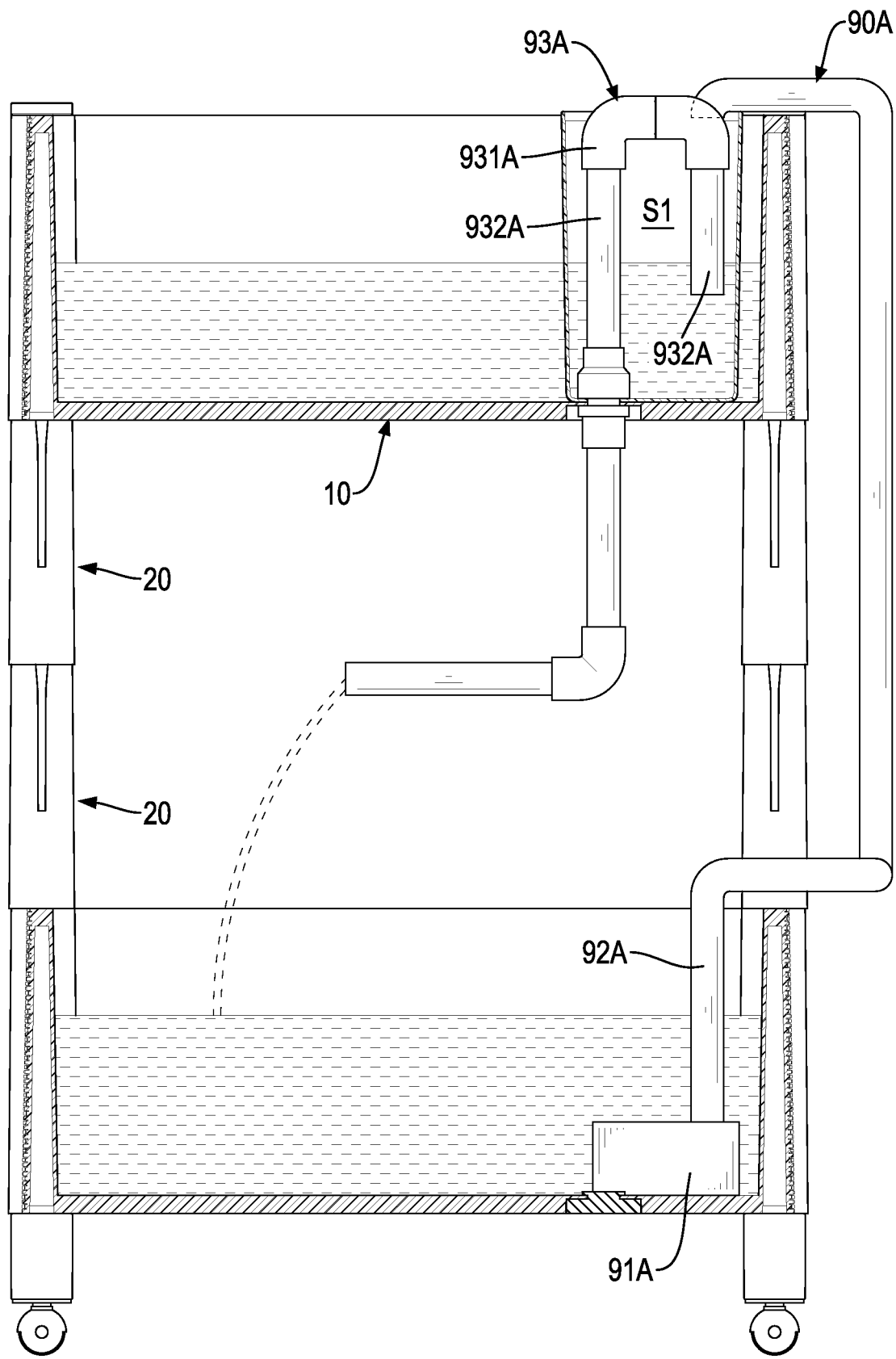
FIG. 19 is a side view in partial section of the fourth embodiment in FIG. 17.

The recycling system 90A in the fourth embodiment makes water recycle between the two containers 10 of the upper cultivation assembly 1 and the lower cultivation assembly 1. The container 10 of the lower cultivation assembly 1 can be applied for cultivating fish, shrimp, or other small animals. The container 10 of the upper cultivation assembly 1 can be applied to cultivate plants. The nitrogen in excretion of the fish and the shrimp can be drawn with water by the pump 91A. With reference to FIG. 19, water from the container 10 of the lower cultivation assembly 1 enters the container 10 of the upper cultivation assembly 1 via the conducting pipe 92A. Water flows through the filtering box 94A. The filtering sponge 944A disposed within the second space S2 of the filtering box 94A blocks solid excretion. Nitrogen within water is turned into ammonia or nitrate through nitrogen fixation of bacteria. The ammonia or the nitrate can be absorbed by the plants and provide nutrition to the plants. Purified water enters the introducing set 93A and returns to the container 10 of the lower cultivation assembly 1 by siphonage. The plants cultivated within the container 10 of the upper cultivation assembly 1 can thrive without fertilization. The fish or shrimp cultivated within the container 10 of the lower cultivation assembly 1 is provided with purified water.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cultivation assembly comprising:
    a first container having a surrounding wall erectly disposed, wherein the surrounding wall comprises multiple side plates;
    each one of the multiple side plates having
        a top face; and
        multiple combining holes defined in the top face of the side plate;
    at least one first engaging structure facing outward with respect to the first container;
    an engaging member configured to connect the first container side by side to a second container having a plurality of side walls that each have a top surface with a plurality of combining apertures therein, the engaging member having
        two second engaging structures facing opposite directions, and each one of the two second engaging structures capable of engaging with one of the at least one first engaging structure; and
    a combining unit having two engaging rows;
    each engaging row having multiple engaging protrusions;
    wherein the multiple engaging protrusions of one of the two engaging rows are capable of respectively engaging with the multiple combining holes of one of the multiple side plates of the first container; wherein the multiple engaging protrusions of the other of the two engaging rows are capable of respectively engaging with the combining apertures of one of the plurality of side walls of the second container.

2. The cultivation assembly as claimed in claim 1, wherein
    the surrounding wall comprises at least one pillar having a peripheral surface;
    the first container comprises
        an opening surrounded by the surrounding wall; and
        the at least one first engaging structure is formed in the peripheral surface of each pillar of the at least one pillar, wherein a portion of each pillar of the at least one pillar extends to the opening of the first container.

3. The cultivation assembly as claimed in claim 2, wherein
    each one of the at least one first engaging structure is an extending groove; and
    each one of the two second engaging structures of the engaging member is an elongated protrusion.

4. The cultivation assembly as claimed in claim 1, wherein
    the cultivation assembly comprises multiple connecting members, and each one of the multiple connecting members comprises
        a peripheral surface;
        a first end; and
        a second end disposed opposite to the first end of the connecting member;
    the first end of each one of the multiple connecting members is connected to the first container; and
    the at least one first engaging structure is formed in the peripheral surface of each one of the multiple connecting members and extends to the second end of each connecting member respectively.

5. The cultivation assembly as claimed in claim 4, wherein each one of the at least one first engaging structure is an extending groove; and each one of the two second engaging structures of the engaging member is an elongated protrusion.

6. The cultivation assembly as claimed in claim 5, wherein each one of the multiple connecting members further comprises at least one third engaging structure formed in the peripheral surface of each one of the multiple connecting members;

wherein the cultivation assembly further comprises at least one fence, each one of the at least one fence capable of being disposed between two adjacent connecting members of the multiple connecting members and having two opposite ends; and two fourth engaging structures respectively disposed at the two opposite ends of each fence, and wherein for each fence:

one of the two fourth engaging structures is engaged with one of the at least one third engaging structure formed in the peripheral surface of one of the two adjacent connecting members, and the other one of the two fourth engaging structures is engaged with one of the at least one third engaging structure formed in the peripheral surface of the other one of the two adjacent connecting members.

* * * * *